US012608779B2

(12) United States Patent     (10) Patent No.:   US 12,608,779 B2

G et al.     (45) Date of Patent:    Apr. 21, 2026

(54) SYSTEMS AND METHODS FOR IMAGE VIGNETTING REPLACEMENT

(71) Applicant: ADOBE INC., San Jose, CA (US)

(72) Inventors: Arjun Haarith G, Bangalore (IN); Ankur Murarka, Bangalore (IN)

(73) Assignee: ADOBE INC., San Jose, CA (US)

( * ) Notice: Subject to any disclaimer, the term of this patent is extended or adjusted under 35 U.S.C. 154(b) by 271 days.

(21) Appl. No.: 18/331,266

(22) Filed: Jun. 8, 2023

(65) Prior Publication Data

US 2024/0412341 A1     Dec. 12, 2024

(51) Int. Cl.
| | |
|---|---|
| G06T 5/77 | (2024.01) |
| G06T 5/50 | (2006.01) |
| G06T 7/13 | (2017.01) |
| G06T 7/90 | (2017.01) |
| G06T 11/60 | (2006.01) |

(52) U.S. Cl.
CPC ................. G06T 5/77 (2024.01); G06T 5/50 (2013.01); G06T 7/13 (2017.01); G06T 7/90 (2017.01); G06T 11/60 (2013.01); *G06T 2207/10016* (2013.01); *G06T 2207/10024* (2013.01); *G06T 2207/20021* (2013.01); *G06T 2207/20221* (2013.01)

(58) Field of Classification Search
CPC ... G06T 5/77; G06T 7/13; G06T 11/60; G06T 5/00; G06T 7/194; G06T 7/11; G06T 2207/20021
See application file for complete search history.

(56) References Cited

U.S. PATENT DOCUMENTS

| | | | | |
|---|---|---|---|---|
| 9,305,360 | B2 * | 4/2016 | Parfenov | ................. G06T 7/174 |
| 10,825,148 | B2 * | 11/2020 | Tagra | ......................... G06T 5/75 |
| 10,861,127 | B1 * | 12/2020 | Terree | ................. H04N 23/815 |
| 2013/0315498 | A1 * | 11/2013 | Yurkov | ................. G06T 7/593 |
| | | | | 382/254 |

(Continued)

FOREIGN PATENT DOCUMENTS

| | | | | | |
|---|---|---|---|---|---|
| CN | | 107341803 | B | * 11/2020 | ............... G06T 5/50 |
| CN | | 115578488 | A | * 1/2023 | ............. G06T 11/60 |
| WO | WO-2019005170 | A1 | * | 1/2019 | |

OTHER PUBLICATIONS

Satoshi Iizuka, Edgar Simo-Serra, and Hiroshi Ishikawa. 2017. Globally and locally consistent image completion. ACM Trans. Graph. 36, 4, Article 107 (Aug. 2017), 14 pages. https://doi.org/10.1145/3072959.3073659 (Year: 2017).*

(Continued)

*Primary Examiner* — Tammy Paige Goddard
*Assistant Examiner* — Aidan W Mccoy
(74) *Attorney, Agent, or Firm* — CHAU & ASSOCIATES, LLC

(57) ABSTRACT

Systems and methods for image generation are provided. An aspect of the systems and methods includes obtaining a digital image including a content area and a border area that includes at least two corners of the digital image; generating a border mask for the border area based on a symmetry of the border area with respect to the at least two corners; and generating a generated image based on the border mask, wherein the generated image includes the content area and a generated area corresponding to the border area, and wherein the generated area depicts an extension to content from the content area.

16 Claims, 12 Drawing Sheets

(56) References Cited

U.S. PATENT DOCUMENTS

| | | | |
|---|---|---|---|
| 2017/0132810 A1* | 5/2017 | Gilra | G06V 10/993 |
| 2021/0056668 A1* | 2/2021 | Barnes | G06T 7/33 |
| 2021/0287799 A1* | 9/2021 | Guendel | G16H 30/40 |
| 2021/0398288 A1* | 12/2021 | Bhattacharya | G06T 7/12 |
| 2023/0274384 A1* | 8/2023 | Bleyer | H04N 13/156 |
| | | | 382/284 |

OTHER PUBLICATIONS

Van Hoorick, B. (2019). Image outpainting and harmonization using generative adversarial networks. arXiv preprint arXiv:1912.10960 (Year: 2019).*

Mennborg, A. (2021). AI-Driven Image Manipulation: Image Outpainting Applied on Fashion Images (Dissertation). Retrieved from https://urn.kb.se/resolve?urn=urn:nbn:se:ltu:diva-85148 (hereinafter "Mennborg") (Year: 2021).*

Kim, Kyunghun, et al. "Painting outside as inside: Edge guided image outpainting via bidirectional rearrangement with progressive step learning." Proceedings of the IEEE/CVF winter conference on applications of computer vision. 2021. (Year: 2021).*

Johannes Kopf, Wolf Kienzle, Steven Drucker, and Sing Bing Kang. 2012. Quality prediction for image completion. ACM Trans. Graph. 31, 6, Article 131 (Nov. 2012), 8 pages. https://doi.org/10.1145/2366145.2366150. (Year: 2012).*

Liu, Guilin, et al. "Partial convolution for padding, inpainting, and image synthesis." IEEE Transactions on Pattern Analysis and Machine Intelligence 45.5 (2022): 6096-6110. (Year: 2022).*

Xiao, P., He, S., Liu, L., & Ming, A. (2023). Mask Reference Image Quality Assessment. ArXiv, abs/2302.13770. (Year: 2023).*

* cited by examiner

Figure 2:
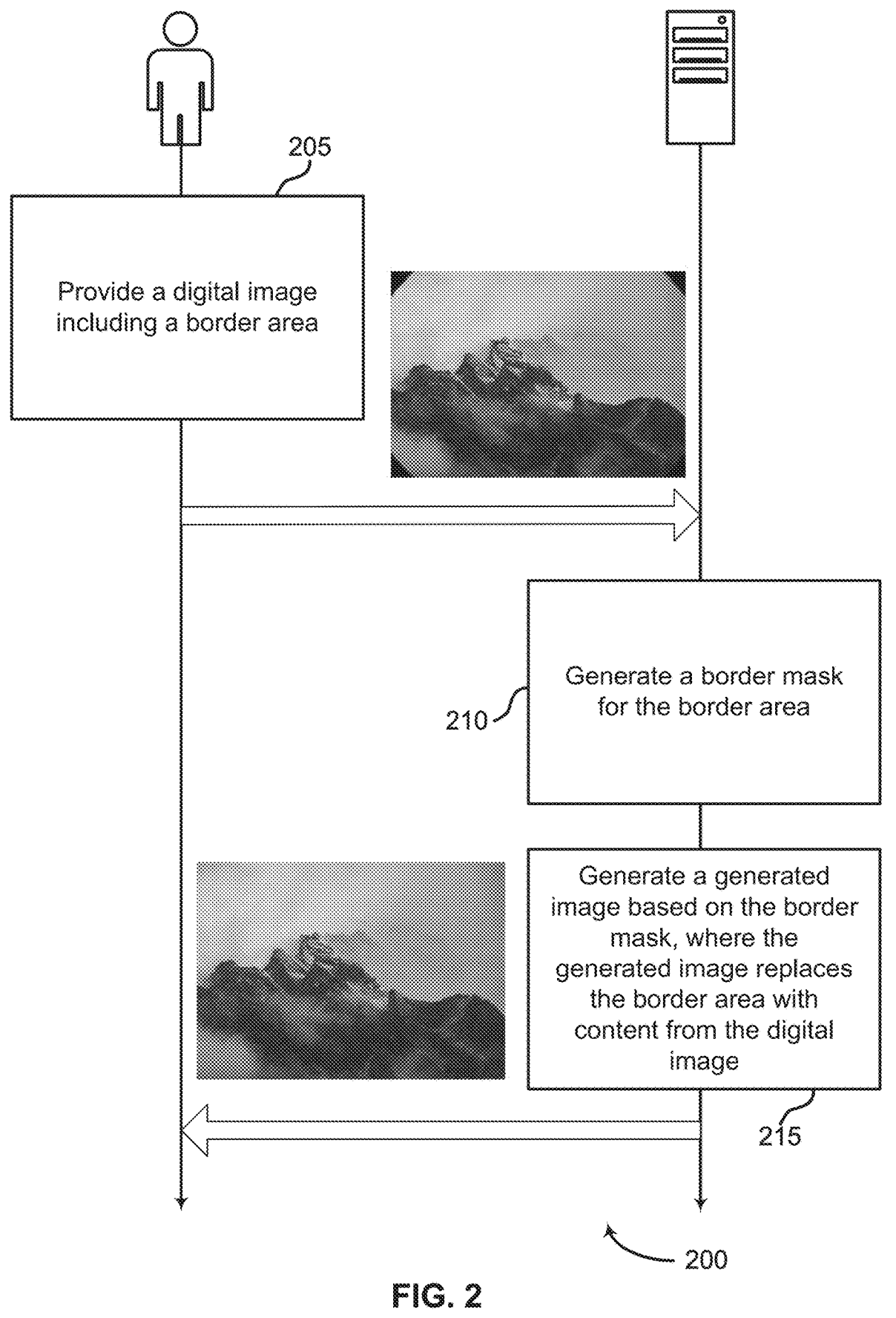

205

Provide a digital image including a border area

210

Generate a border mask for the border area

Generate a generated image based on the border mask, where the generated image replaces the border area with content from the digital image

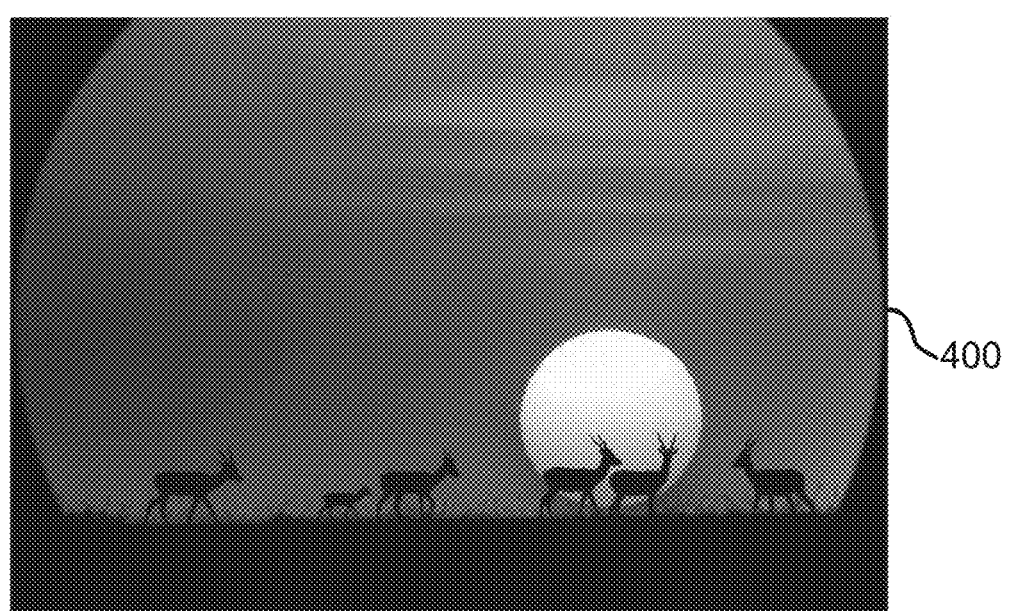
400
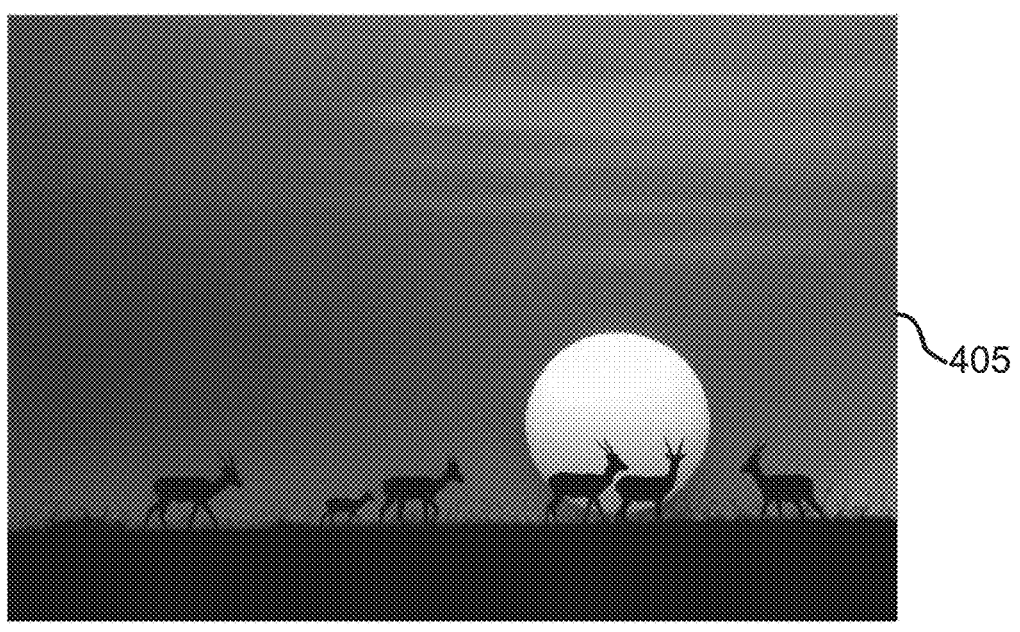
405
FIG. 4

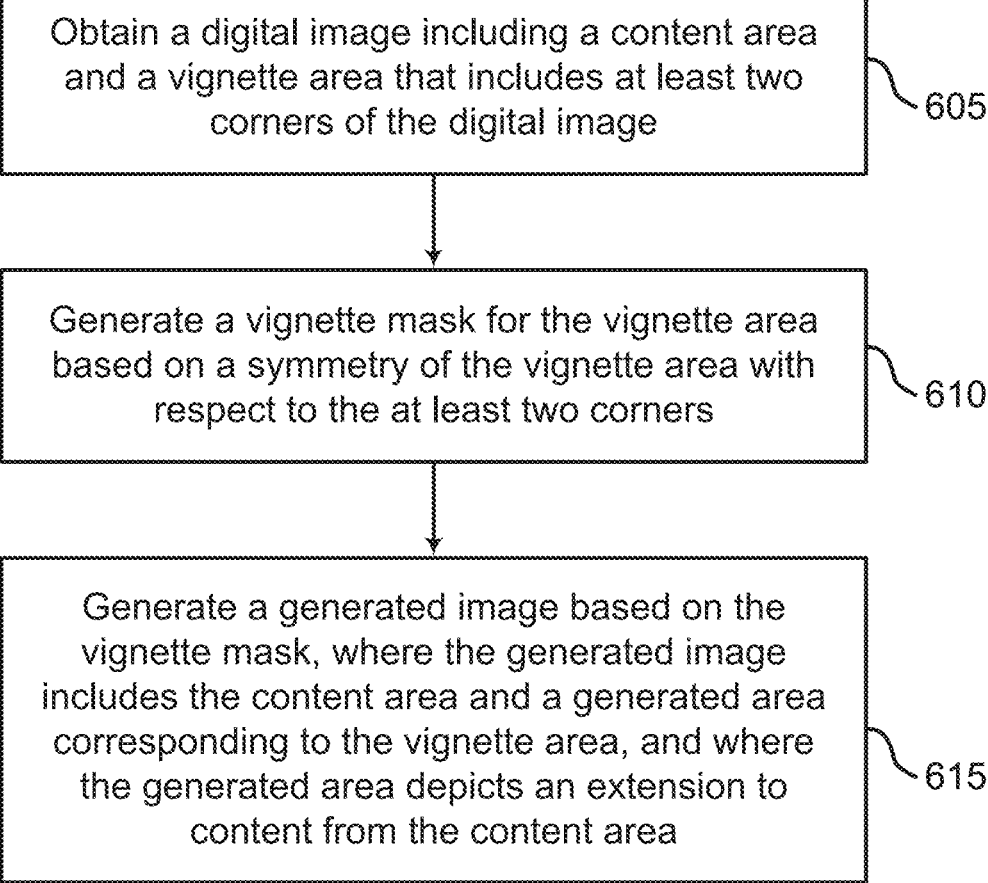

Obtain a digital image including a content area and a vignette area that includes at least two corners of the digital image ⟍605

Generate a vignette mask for the vignette area based on a symmetry of the vignette area with respect to the at least two corners ⟍610

Generate a generated image based on the vignette mask, where the generated image includes the content area and a generated area corresponding to the vignette area, and where the generated area depicts an extension to content from the content area ⟍615

Identify a color of the vignette area

~705

Identify a preliminary vignette mask based on the color of the vignette area

~710

Identify at least one pixel in the content area having the color of the vignette area

~715

Exclude the at least one pixel from the preliminary vignette mask based on the symmetry of the vignette area to obtain the vignette mask

~720

700

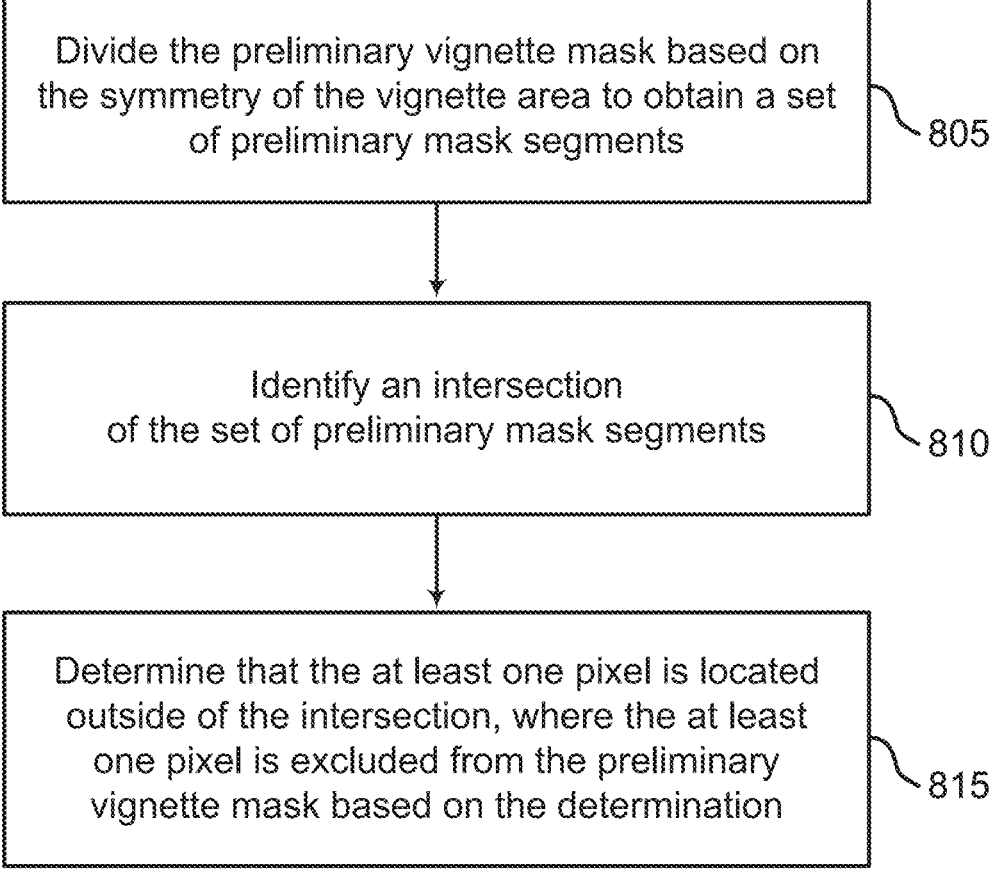

Divide the preliminary vignette mask based on the symmetry of the vignette area to obtain a set of preliminary mask segments ⟍805

Identify an intersection of the set of preliminary mask segments ⟍810

Determine that the at least one pixel is located outside of the intersection, where the at least one pixel is excluded from the preliminary vignette mask based on the determination ⟍815

Figure 12:
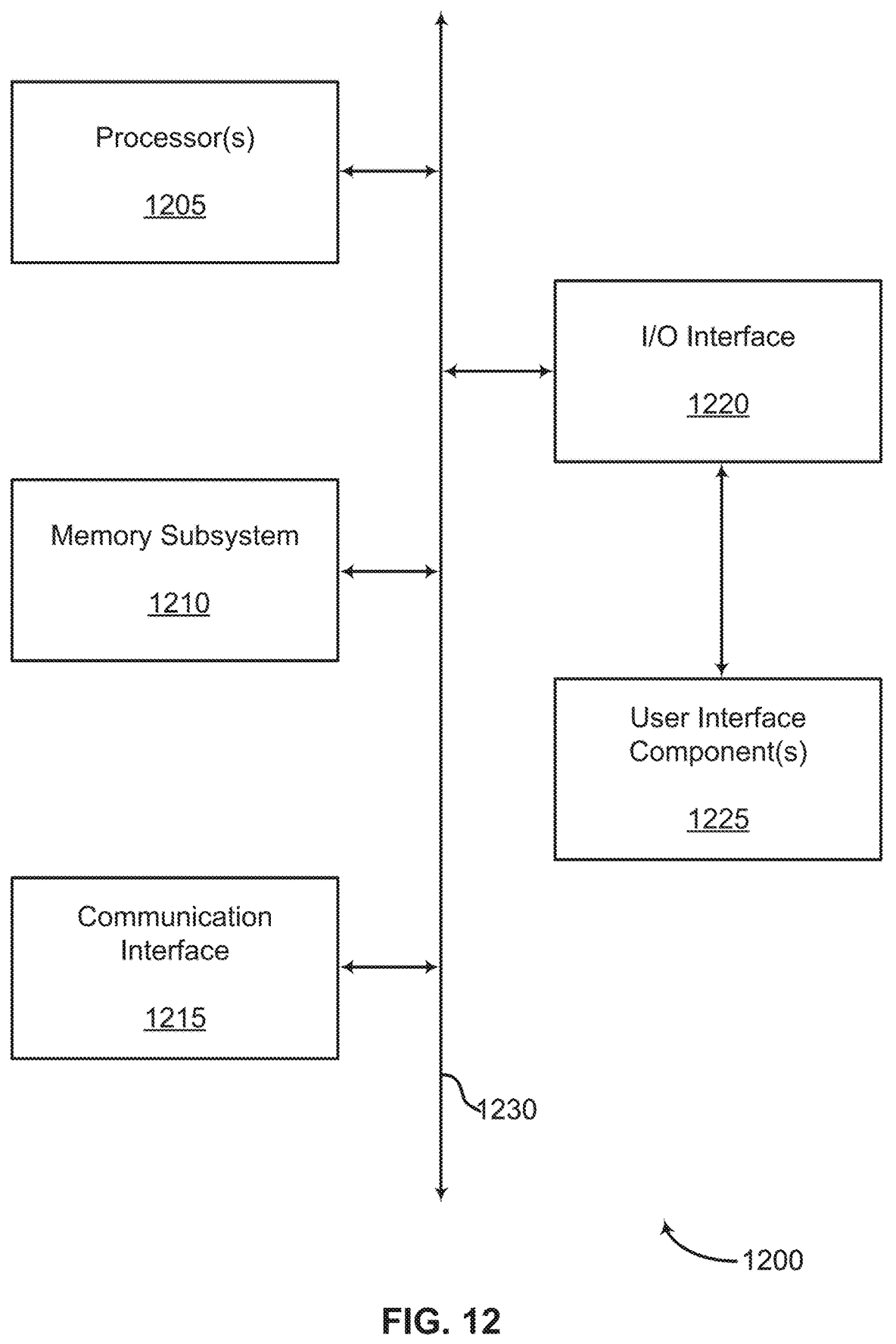

Processor(s)

1205

I/O Interface

1220

Memory Subsystem

1210

User Interface
Component(s)

1225

Communication
Interface

SYSTEMS AND METHODS FOR IMAGE VIGNETTING REPLACEMENT

BACKGROUND

The following relates generally to image generation, and more specifically to image vignetting replacement. Image generation, also known as generative image modeling, refers to a process of creating new images using computer algorithms or machine learning techniques. Image generation may involve generating an image based on a given set of rules, patterns, or training data with a goal of producing a visually coherent and realistic image that resembles the appearance and characteristics of a target concept.

Image vignetting refers to a border that partially surrounds content depicted in an image. In some cases, image vignetting can also refer to light fall-off, which is a darkening of a periphery of an image. Unwanted image vignetting may occur in an image due to circumstances for, or conditions of, the creation of the image. Image vignetting can be removed by cropping a portion of the image including the image vignetting or replaced by editing the portion of the image including the image vignetting.

SUMMARY

Aspects of the present disclosure provide systems and methods for image generation. According to one aspect, an image generation system receives a digital image including a content area depicting content and a border area including a border (such as image vignetting). The image generation system identifies a border mask for the border area based on a symmetry of the digital image and/or a segmentation of the digital image and aligns the border mask with the digital image. The system generates a generated image including the content area of the digital image and a generated area corresponding to the border area of the digital image, where the generated area includes content based on the content area.

By identifying the border mask based on the symmetry and/or segmentation of the digital image and aligning the border mask with the digital image, the image generation system is able to distinguish the border area of the digital image from the content area of the digital image without a manual user identification of the same. Accordingly, aspects of the present disclosure provide an image generation system that replaces a border area of an image more efficiently than conventional image generation systems, which rely on a manual user identification of the border area.

Furthermore, by distinguishing the border area of the digital image from the content area of the digital image, the image generation system is able to avoid cropping the digital image by a predetermined number of pixels to remove the border area, which may result in an unwanted loss of information from the content area and/or a change in a size and shape of the digital image.

A method, apparatus, non-transitory computer readable medium, and system for image generation are described. One or more aspects of the method, apparatus, non-transitory computer readable medium, and system include obtaining a digital image including a content area and a border area that includes at least two corners of the digital image; generating a border mask for the border area based on a symmetry of the border area with respect to the at least two corners; and generating a generated image based on the border mask, wherein the generated image includes the content area and a generated area corresponding to the border area, and wherein the generated area depicts an extension to content from the content area.

A method, apparatus, non-transitory computer readable medium, and system for image generation are described. One or more aspects of the method, apparatus, non-transitory computer readable medium, and system include obtaining a digital image including a content area and a border area including at least two corners of the digital image; identifying a plurality of preliminary mask segments for the border area; identifying an intersection of the plurality of preliminary mask segments; generating a border mask based on the intersection; and generating a generated image based on the border mask, wherein the generated image includes the content area and a generated area corresponding to the border area.

An apparatus and system for image generation are described. One or more aspects of the apparatus and system include one or more processors; one or more memory components coupled with the one or more processors; and an image generation network including parameters stored in the one or more memory components and trained to generate a generated image based on a border mask, wherein the generated image includes a content area of a digital image and a generated area corresponding to a border area of the digital image, and wherein the generated area depicts an extension to content from the content area.

BRIEF DESCRIPTION OF THE DRAWINGS

FIG. 2 shows an example of a method for generating a generated image according to aspects of the present disclosure.

FIG. 4 shows an example of a generated image according to aspects of the present disclosure.

FIG. 6 shows an example of a method for image generation according to aspects of the present disclosure.

FIG. 8 shows an example of a method for excluding a pixel from a preliminary border mask according to aspects of the present disclosure.

FIG. 12 shows an example of a computing device according to aspects of the present disclosure.

DETAILED DESCRIPTION

Figure 1:
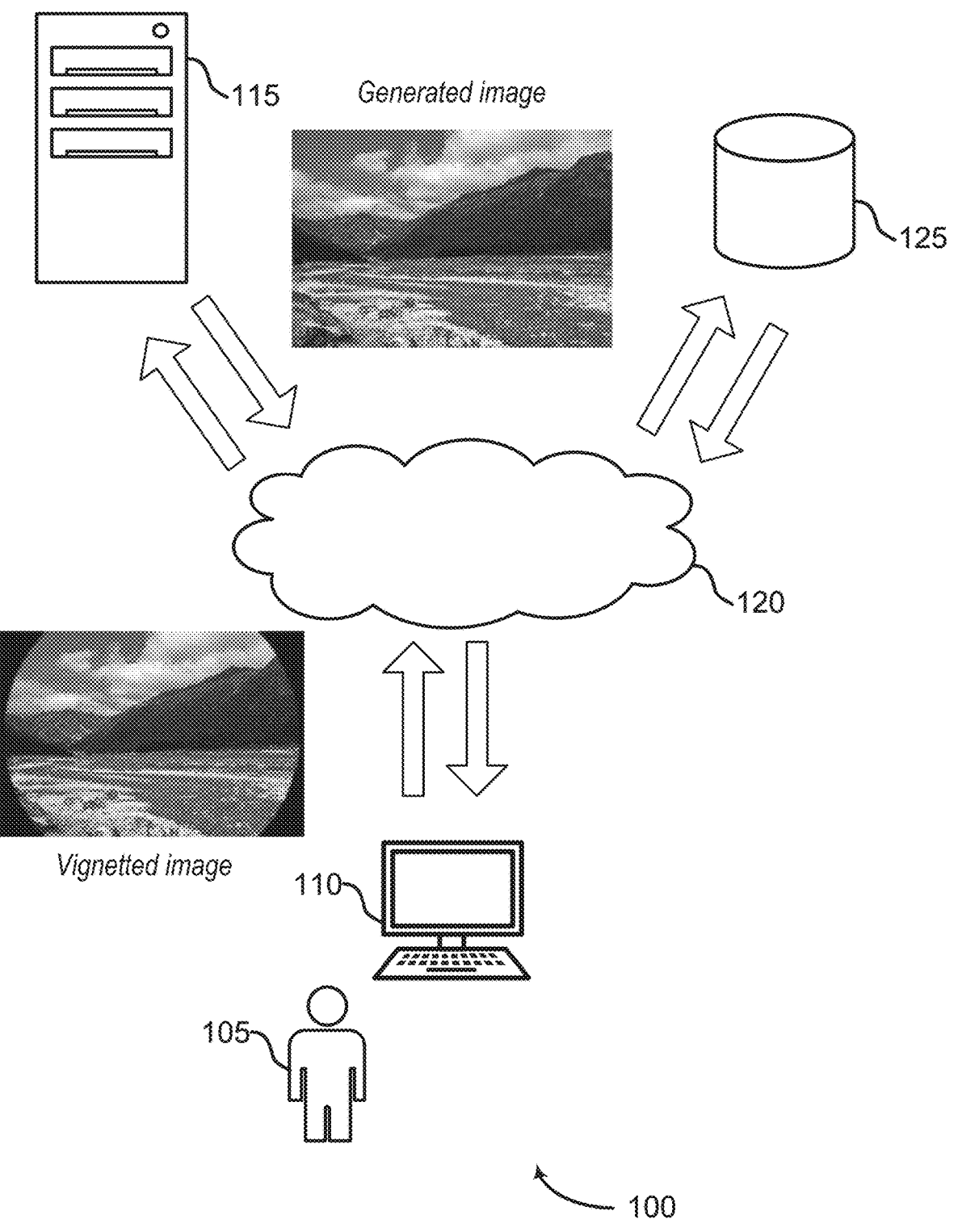
FIG. 1 shows an example of image generation system according to aspects of the present disclosure.

Embodiments of the present disclosure relate generally to image generation, and more specifically to image vignetting replacement. Image vignetting refers to a border that partially surrounds content depicted in an image. In some cases, image vignetting can also refer to light fall-off, which is a darkening of a periphery of an image. Unwanted image vignetting may occur in an image due to circumstances for, or conditions of, the creation of the image. Image vignetting can be removed by cropping a portion of the image including the image vignetting or replaced by editing the portion of the image including the image vignetting.

Conventional image generation systems may rely on a manual user identification of a border area including image vignetting so that the border area can be replaced by the conventional image generation system. However, this is a time-consuming and laborious process. Conventional image generation systems may instead choose to not identify the border area and instead crop an image including the border area by a predetermined number of pixels to remove a portion of the image that is assumed to include the border area. However, this approach may result in an unwanted loss of information from a content area of the image, or may alter a size and shape of the image (for example, by cropping a rectangular image to obtain a circular image).

Aspects of the present disclosure provide systems and methods for image generation. According to one aspect, an image generation system receives a digital image including a content area depicting content and a border area including a border (such as image vignetting). The image generation system identifies a border mask for the border area based on a symmetry of the digital image and/or a segmentation of the digital image and aligns the border mask with the digital image. The system generates a generated image including the content area of the digital image and a generated area corresponding to the border area of the digital image, where the generated area includes content based on the content area.

By identifying the border mask based on the symmetry and/or segmentation of the digital image and aligning the border mask with the digital image, the image generation system is able to distinguish the border area of the digital image from the content area of the digital image without a manual user identification of the same. Accordingly, aspects of the present disclosure provide an image generation system that replaces a border area of an image more efficiently than conventional image generation systems, which rely on a manual user identification of the border area.

Furthermore, by distinguishing the border area of the digital image from the content area of the digital image, the image generation system is able to avoid cropping the digital image by a predetermined number of pixels to remove the border area, which may result in an unwanted loss of information from the content area and/or a change in a size and shape of the digital image.

An embodiment of the present disclosure can be used in an image editing context. For example, a user captures a digital image using a combination of a camera lens and a camera filter that produces unwanted image vignetting in a border area of the digital image (e.g., a dark ring surrounding a central circular portion of the image). The user uploads the digital image to an image generation system according to the present disclosure via a graphical user interface provided by the image generation system on a user device. In some cases, the user device is implemented as the camera. The image generation system identifies that the color of the image vignetting is black (for example, by default, by user instruction, or by an identification of a color of a pixel disposed in each corner of the image) and generates a preliminary border mask that includes each black pixel of the digital image.

The image generation system divides the preliminary border mask into four equally sized quadrants split along a horizontal axis of symmetry and a vertical axis of symmetry and changes an orientation of three of the quadrants along the axes of symmetry to match an orientation of the other quadrant. The image generation system then finds an intersection of each quadrant such that stray black pixels included in the content area but not in the border area are excluded from the preliminary border mask.

After excluding the stray pixels from the preliminary border mask, the image generation system duplicates the intersection and re-orients the duplicated copies of the intersection along the axes of symmetry to obtain a border mask that includes four quadrants corresponding to the orientation of the preliminary border mask quadrants.

The image generation system then uses the border mask to identify the border area in the digital image. The image generation system accordingly avoids a manual identification of the image vignetting by the user, and also avoids cropping the digital image.

The image generation system then generates a generated image by extrapolating content from the central circular portion of the image to the area identified by the border mask (for example, via a machine learning model). This image editing process can be either destructive, in which the digital image and the generated content for the digital image share a layer in the generated image, or non-destructive, in which the digital image and the generated content for the digital image are disposed in different layers. The image generation system then provides the generated image to the user (for example, via the graphical user interface).

Further examples of the present disclosure in the image editing context are provided with reference to FIGS. 1-4. Details regarding the architecture of the image generation system are provided with reference to FIGS. 1, 5, and 12. Examples of a process for image generation are provided with reference to FIGS. 6-11.

Accordingly, aspects of the present disclosure provide an image generation system that is able to identify a border area of an image (for example, an area including image vignetting) based on one or more characteristics of the image. Therefore, either a laborious and time-consuming user identification of the border area or a cropping of the image according to an arbitrary number of pixels is avoided. Aspects of the present disclosure thus provide an image generation system that can replace the border area with generated content in a more efficient and/or less destructive manner than conventional image generation systems.

Image Generation System

A system and an apparatus for image generation are described with reference to FIGS. 1-5 and 12. One or more aspects of the apparatus include one or more processors; one or more memory components coupled with the one or more processors; and an image generation network including parameters stored in the one or more memory components and trained to generate a generated image based on a border mask, wherein the generated image includes a content area of a digital image and a generated area corresponding to a border area of the digital image, and wherein the generated area depicts an extension to content from the content area.

Some examples of the apparatus and system further include a mask component designed to generate the border mask based on a symmetry of the border area with respect to at least two corners of the digital image.

FIG. 1 shows an example of image generation system 100 according to aspects of the present disclosure. The example shown includes user 105, user device 110, image generation apparatus 115, cloud 120, and database 125.

Referring to FIG. 1, user 105 provides an image including a border area (e.g., an area including image vignetting) and a content area (e.g., an area that includes a depiction of one or more objects, entities, backgrounds, etc.) to image generation apparatus 115 via a graphical user interface provided on user device 110 by image generation apparatus 115. Image generation apparatus 115 generates a border mask for the image, applies the border mask to the image, and generates a generated image by extrapolating content from the content area of the image (for example, via a machine learning model) to an area corresponding to both the border mask and the border area of the image. Image generation apparatus 115 provides the generated image to user 105 (for example, via the graphical user interface).

In some cases, a "content area" refers to an area of an image that depicts content. As used herein, "content" refers to any visual element (such as an object, entity, background, landscape, etc.) that is depicted in an image. In some cases, a content area of an image can be expressed as a complement to a border area of the image.

As used herein, a "border area" of an image includes a border that at least partially surrounds the content area of the image. In some cases, a border area includes two or more (for example, four) corners of the image. In some cases, each pixel of the border includes a same color. In some cases, the color is black. In some cases, portions of the border are symmetrical to each other with respect to one or more axes of symmetry (for example, the portions are mirrored across the axes of symmetry). In some cases, a border area can be expressed as a complement to a content area of the image, such that the border area is an area of the image from which a depiction of content is omitted.

In some cases, the border includes image vignetting. "Image vignetting" refers to a darkened portion of an image that at least partially surrounds the content area of the image. For example, in some cases, image vignetting is a circular ring of dark pixels partially surrounding the content area. The inclusion of image vignetting in an image can be intentional, but can also be an unintentional result of conditions for the creation of the image.

In some cases, a "mask" refers to an image or other suitable data (such as a scalable vector file) that is used to identify a portion, region, area, etc. of an image, where a masked region of the mask corresponds to the portion, etc. of the image and a non-masked region of the mask corresponds to the remaining portions, etc. of the image. In some cases, by superimposing the mask with the image or otherwise combining the mask with the image, a masked region of the image may therefore be distinguished from a non-masked region of the image.

According to some aspects, user device 110 is a personal computer, laptop computer, mainframe computer, palmtop computer, personal assistant, mobile device, or any other suitable processing apparatus. For example, in some cases, user device 110 comprises a digital camera that is used to capture a digital image. In some examples, user device 110 includes software that displays a user interface (e.g., a graphical user interface) provided by image generation apparatus 115. In some aspects, the user interface allows information (such as an image, a border mask, an instruction, a prompt, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, image generation apparatus 115 includes a computer-implemented network. In some embodiments, the computer-implemented network includes a machine learning model (such as the image generation network described with reference to FIG. 5). In some embodiments, image generation apparatus 115 also includes one or more processors, a memory subsystem, a communication interface, an I/O interface, one or more user interface components, and a bus as described with reference to FIG. 12. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Image generation apparatus 115 is an example of, or includes aspects of, the corresponding element described with reference to FIG. 5. Further detail regarding the architecture of image generation apparatus 115 is provided with reference to FIGS. 5 and 12. Further detail regarding a process for image generation is provided with reference to FIGS. 6-11.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet.

Some large cloud networks have functions distributed over multiple locations from central servers. A server is designated an edge server if it has a direct or close connection to a user. In some cases, cloud 120 is limited to a single organization. In other examples, cloud 120 is available to many organizations.

In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for generating a generated image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a user (such as the user described with reference to FIG. 1) uses an image generation system (such as the image generation system described with reference to FIG. 1) to generate a generated image based on a digital image including a border area. In an example, the user captures the digital image using a camera and lens combination that produces unwanted image vignetting within the image. The image generation system can generate a generated image for the user by identifying the border area including the image vignetting, generating a border mask for the border area, and, based on the border mask, extending content from the digital image to a region of the generated image that corresponds to the border area. Accordingly, the image generation system generates an image that replaces image vignetting in a digital image with an extension of the content of the digital image.

At operation 205, the user provides a digital image including a border area. In some cases, the operations of this step refer to, or may be performed by, a user as described with reference to FIG. 1. In an example, the user provides the original image to the image generation system via a graphical user interface provided on a user device (such as the user device described with reference to FIG. 1) by the image generation system. In some cases, the border area includes image vignetting.

At operation 210, the system generates a border mask for the border area. In some cases, the operations of this step refer to, or may be performed by, an image generation apparatus as described with reference to FIGS. 1 and 5. For example, in some cases, the image generation apparatus generates the border mask as described with reference to FIGS. 6-11.

At operation 215, the system generates a generated image based on the border mask, where the generated image replaces the border area with content from the digital image. In some cases, the operations of this step refer to, or may be performed by, an image generation apparatus as described with reference to FIGS. 1 and 5. For example, in some cases, the image generation apparatus generates the generated image as described with reference to FIGS. 6-11.

Figure 3:
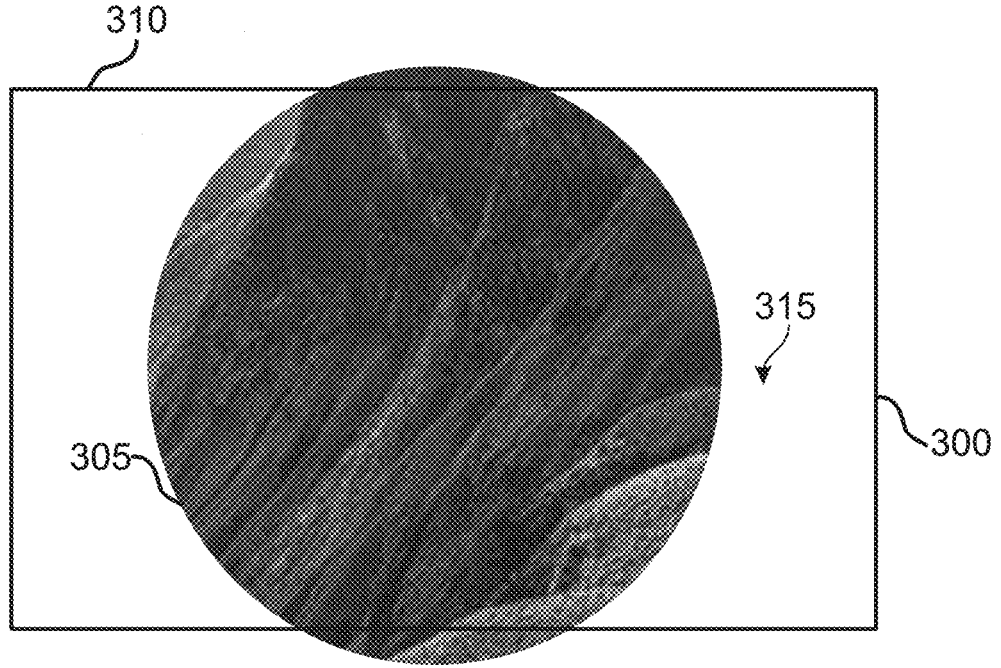
FIG. 3 shows an example of a digital image including a border area according to aspects of the present disclosure.

FIG. 3 shows an example of a digital image including a border area according to aspects of the present disclosure. The example shown includes digital image 300, image circle from DX lens 305, full frame sensor 310, and border area 315.

Referring to FIG. 3, image vignetting can be produced in a border area of an image due to certain combinations of cameras and lenses used in capturing the image. For example, digital image 300 is an example of an image captured using a combination of a DX lens (e.g., a crop frame lens) and full frame sensor 310 (where full frame sensor 310 is shown to be coextensive with digital image 300). Due to this combination of camera lens and camera sensor, image circle from DX lens 305 does not fit entirely within full frame sensor 310, resulting in image vignetting included in border area 315. Border area 315 is illustrated as including white pixels for ease of illustration, but a border area can include any color. For example, pixels in image vignetting are typically dark colored (e.g., black).

Image vignetting can also occur due to a combination of camera lenses and external objects, such as filters, camera lens hoods, camera filter holders, camera adapter rings, etc. For example, an image captured using a circular polarizing filter placed in front of a wide-angle lens can include image vignetting. An outer layer of the circular polarizing filter can intersect with the field of view of the wide-angle lens, producing image vignetting at peripheral areas of the image. Embodiments of the present disclosure are not limited by the manner in which image vignetting occurs.

FIG. 4 shows an example of a generated image according to aspects of the present disclosure. The example shown includes digital image 400 and generated image 405. Digital image 400 is an example of, or includes aspects of, the corresponding element described with reference to FIGS. 9 and 11.

Referring to FIG. 4, generated image 405 is an example of an image generated by an image generation apparatus (such as the image generation apparatus described with reference to FIGS. 1 and 5) based on digital image 400. Digital image 400 includes a border area including four corners of digital image 400 and partially surrounding a content area having a circular perimeter. Generated image 405 includes content from the content area of digital image 400 as well as generated content that has been extended from the content area to replace the border area.

As shown in FIG. 4, both the content area and the border area of digital image 400 include black pixels (for example, pixels corresponding to each of the foreground, the animals, and the image vignetting), and so a mask that accurately distinguishes the border area from the content area could not be determined on the basis of pixel color alone, as the mask would include pixels from both the border area and the content area. Instead, in some cases, the image generation apparatus determines a border mask based on a symmetry of the border area such that the border mask does not mask pixels from the content area so that generated image 405 preserves all or most of the content of digital image 400.

Figure 5:
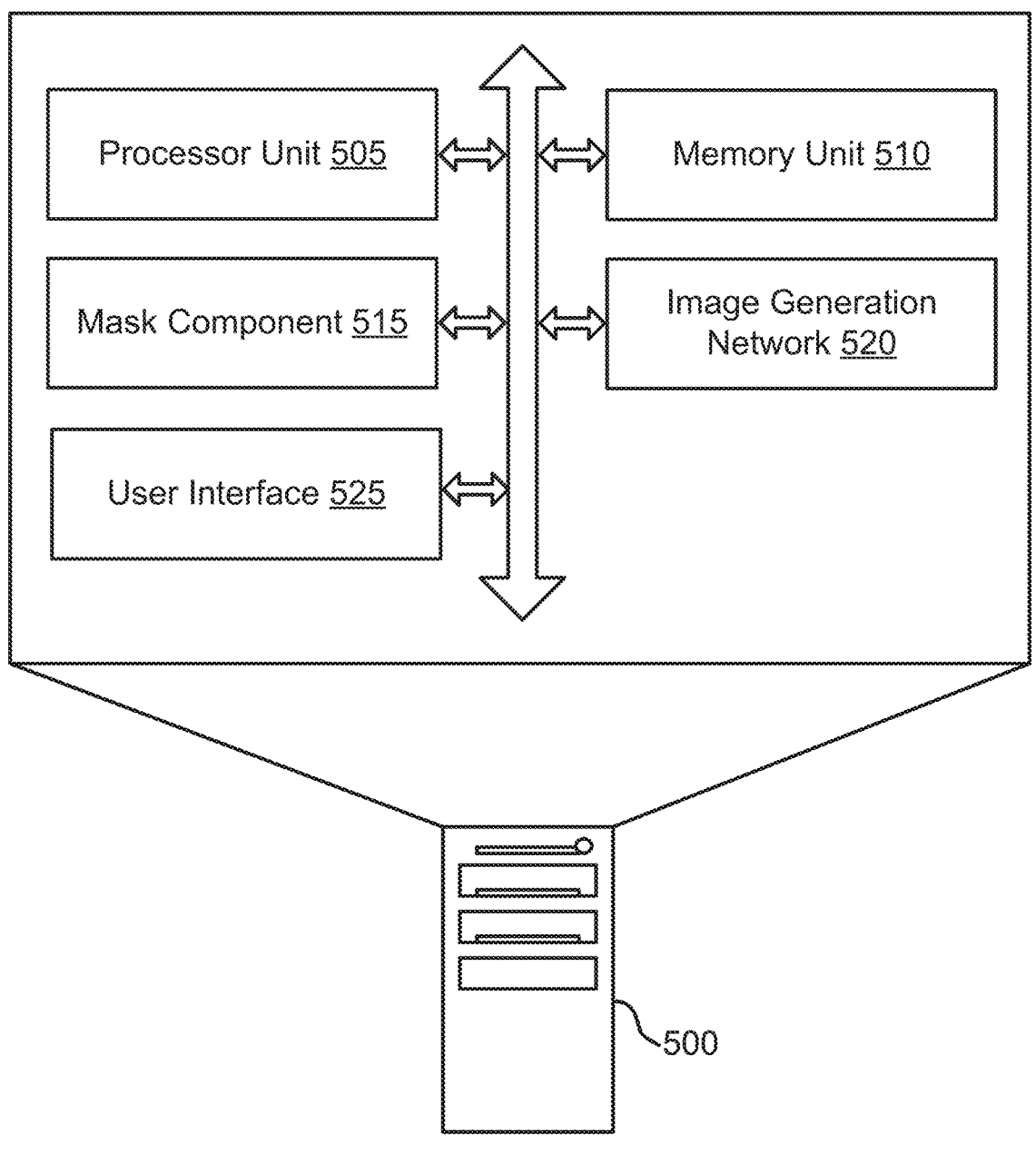
FIG. 5 shows an example of an image generation apparatus according to aspects of the present disclosure.

FIG. 5 shows an example of image generation apparatus 500 according to aspects of the present disclosure. Image generation apparatus 500 is an example, or includes aspects of, the corresponding element described with reference to FIG. 1. The example shown includes processor unit 505, memory unit 510, mask component 515, image generation network 520, and user interface 525.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 510 to perform various functions. In some aspects, processor unit 505 includes special purpose components for modem processing, baseband processing, digital signal processing, or transmission processing. According to some aspects, processor unit 505 comprises the one or more processors described with reference to FIG. 12.

Memory unit 510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 505 to perform various functions described herein.

In some cases, memory unit 510 includes a basic input/output system (BIOS) that controls basic hardware or software operations, such as an interaction with peripheral components or devices. In some cases, memory unit 510 includes a memory controller that operates memory cells of memory unit 510. For example, the memory controller may include a row decoder, column decoder, or both. In some cases, memory cells within memory unit 510 store information in the form of a logical state. According to some aspects, memory unit 510 comprises the memory subsystem described with reference to FIG. 12.

According to some aspects, image generation apparatus 500 uses at least one processor included in processor unit 505 to execute instructions stored in at least one memory device included in memory unit 510 to perform operations.

For example, according to some aspects, image generation apparatus 500 obtains a digital image including a content area and a border area that includes at least two corners of the digital image. In some examples, image generation apparatus 500 provides the digital image in a first layer of a generated image. In some examples, image generation apparatus 500 provides a generated area in a second layer of the generated image.

In some examples, image generation apparatus 500 receives an edit to the digital image. In some examples, image generation apparatus 500 modifies the generated image based on the edit by editing the digital image in a first layer.

In some examples, image generation apparatus 500 obtains an additional digital image. In some aspects, the digital image and the additional digital image are obtained using a same set of camera characteristics. In some aspects, the digital image and the additional digital image include frames of a single video. In some examples, image generation apparatus 500 combines the generated image and the additional generated image to obtain a merged generated image.

According to some aspects, mask component 515 is implemented as software stored in memory unit 510 and executable by processor unit 505, as firmware, as one or more hardware circuits, or as a combination thereof.

According to some aspects, mask component 515 generates a border mask for the border area based on a symmetry of the border area with respect to the at least two corners. In some examples, mask component 515 identifies a color of the border area. In some examples, mask component 515 identifies a preliminary border mask based on the color of the border area. In some examples, mask component 515 identifies at least one pixel in the content area having the color of the border area. In some aspects, the color includes a black color. In some examples, mask component 515 excludes the at least one pixel from the preliminary border mask based on the symmetry of the border area to obtain the border mask.

In some examples, mask component 515 divides the preliminary border mask based on the symmetry of the border area to obtain a set of preliminary mask segments. In some examples, mask component 515 identifies an intersection of the set of preliminary mask segments. In some examples, mask component 515 determines that the at least one pixel is located outside of the intersection, where the at least one pixel is excluded from the preliminary border mask based on the determination.

In some examples, mask component 515 changes an orientation of a first preliminary mask segment of the set of preliminary mask segments to obtain a flipped preliminary mask segment. In some examples, mask component 515 compares the flipped preliminary mask segment to a second preliminary mask segment of the set of preliminary mask segments to obtain the intersection. In some examples, mask component 515 identifies a pixel buffer surrounding the border area. In some examples, mask component 515 includes the pixel buffer in the border mask.

According to some aspects, mask component 515 identifies a set of preliminary mask segments for the border area. In some examples, mask component 515 identifies an intersection of the set of preliminary mask segments. In some examples, mask component 515 generates a border mask based on the intersection. In some examples, mask component 515 changes an orientation of a first preliminary mask segment of the set of preliminary mask segments to obtain a flipped preliminary mask segment. In some examples, mask component 515 compares the flipped preliminary mask segment to a second preliminary mask segment of the set of preliminary mask segments to obtain the intersection.

According to some aspects, mask component 515 is designed to generate the border mask based on a symmetry of the border area with respect to at least two corners of the digital image.

According to some aspects, image generation network 520 comprises image generation parameters stored in memory unit 510. Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

In machine learning algorithms, parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a strength of connections between neurons and influence the neural network's ability to capture complex patterns in data.

According to some aspects, image generation network 520 is implemented as software stored in memory unit 510 and executable by processor unit 505, as firmware, as one or more hardware circuits, or as a combination thereof.

According to some aspects, image generation network 520 is a machine learning model comprising one or more ANNs. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from an ANN's hidden layers and are produced by the output layer. As the ANN's understanding of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation network 520 is an ANN that is trained, designed, and/or configured to generate a generated image based on the border mask, where the generated image includes the content area and a generated area corresponding to the border area, and where the generated area depicts an extension to content from the content area. For example, in some cases, image generation network 520 is implemented as one or more of a convolutional neural network (CNN), a variational autoencoder (VAE), a generative adversarial network (GAN), a diffusion model, or any other ANN that is trained to generate an image.

A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

A VAE is an ANN that learns to encode and decode images. In some cases, a VAE comprises an encoder network that maps an input image to a lower-dimensional latent space and a decoder network that generates a new image from the latent space representation. A VAE can generate different images by sampling different points in the latent space.

A GAN is class of ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The training objective of the generator is to increase an error rate of the discriminator by producing novel candidates that the discriminator classifies as "real" (e.g., belonging to the true data distribution). Therefore, given a training set, the GAN learns to generate new data with similar properties as the training set. A GAN may be trained via supervised learning, semi-supervised learning, unsupervised learning, or reinforcement learning.

A diffusion model is a class of ANN that is trained to generate an image by learning an underlying probability distribution of the training data that allows the model to iteratively refine the generated image using a series of diffusion steps. In some cases, a reverse diffusion process of the diffusion model starts with a noise vector or a randomly initialized image. In each diffusion step of the reverse diffusion process, the model applies a sequence of transformations (such as convolutions, up-sampling, down-sampling, and non-linear activations) to the image, gradually "diffusing" the original noise or image to resemble a real sample. During the reverse diffusion process, the diffusion model estimates the conditional distribution of the next image given the current image (for example, using a CNN or a similar architecture).

According to some aspects, image generation network 520 generates a generated image based on the border mask, where the generated image includes the content area and a generated area corresponding to the border area, and where the generated area depicts an extension to content from the content area. In some examples, image generation network 520 aligns the border mask with the digital image. In some examples, image generation network 520 generates the generated area based on the aligned border mask.

In some examples, image generation network 520 replaces the border area with the generated area to obtain the generated image. In some examples, image generation network 520 provides the digital image in a first layer of the generated image. In some examples, image generation network 520 provides the generated area in a second layer of the generated image. In some examples, image generation network 520 generates an additional generated image based on the additional digital image and the border mask from the digital image.

According to some aspects, image generation network 520 generates a generated image based on the border mask, where the generated image includes the content area and a generated area corresponding to the border area. In some examples, image generation network 520 replaces the border area with the generated area to obtain the generated image.

According to some aspects, user interface 525 provides for communication between a user device (such as the user device described with reference to FIG. 1) and image generation apparatus 500. For example, in some cases, user interface 525 is a graphical user interface (GUI) provided on the user device by image generation apparatus 500.

Image Generation

A method for image generation is described with reference to FIGS. 6-11. One or more aspects of the method include obtaining a digital image including a content area and a border area that includes at least two corners of the digital image; generating a border mask for the border area based on a symmetry of the border area with respect to the at least two corners; and generating a generated image based on the border mask, wherein the generated image includes the content area and a generated area corresponding to the border area, and wherein the generated area depicts an extension to content from the content area. In some cases, the generated area replaces the border area of the digital image in the generated image.

Some examples of the method further include identifying a color of the border area. Some examples further include identifying a preliminary border mask based on the color of the border area. Some examples further include identifying at least one pixel in the content area having the color of the border area. In some aspects, the color includes a black color. Some examples further include excluding the at least one pixel from the preliminary border mask based on the symmetry of the border area to obtain the border mask.

Some examples of the method further include dividing the preliminary border mask based on the symmetry of the border area to obtain a plurality of preliminary mask segments. Some examples further include identifying an intersection of the plurality of preliminary mask segments. Some examples further include determining that the at least one pixel is located outside of the intersection, wherein the at least one pixel is excluded from the preliminary border mask based on the determination.

Some examples of the method further include changing an orientation of a first preliminary mask segment of the plurality of preliminary mask segments to obtain a flipped preliminary mask segment. Some examples further include comparing the flipped preliminary mask segment to a second preliminary mask segment of the plurality of preliminary mask segments to obtain the intersection.

Some examples of the method further include aligning the border mask with the digital image. Some examples further include generating the generated area based on the aligned border mask. Some examples of the method further include identifying a pixel buffer surrounding the border area. Some examples further include including the pixel buffer in the border mask.

Some examples of the method further include replacing the border area with the generated area to obtain the generated image. Some examples of the method further include providing the digital image in a first layer of the generated image. Some examples further include providing the generated area in a second layer of the generated image.

Some examples of the method further include receiving an edit to the digital image. Some examples further include modifying the generated image based on the edit by editing the digital image in the first layer.

Some examples of the method further include obtaining an additional digital image. Some examples further include generating an additional generated image based on the additional digital image and the border mask from the digital image. In some aspects, the digital image and the additional digital image are obtained using a same set of camera characteristics. In some aspects, the digital image and the additional digital image comprise frames of a single video. Some examples of the method further include combining the generated image and the additional generated image to obtain a merged generated image.

A method for image generation is described with reference to FIGS. 6-11. One or more aspects of the method include obtaining a digital image including a content area and a border area including at least two corners of the digital image; identifying a plurality of preliminary mask segments for the border area; identifying an intersection of the plurality of preliminary mask segments; generating a border mask based on the intersection; and generating a generated image based on the border mask, wherein the generated image includes the content area and a generated area corresponding to the border area.

Some examples of the method further include changing an orientation of a first preliminary mask segment of the plurality of preliminary mask segments to obtain a flipped preliminary mask segment. Some examples further include comparing the flipped preliminary mask segment to a second preliminary mask segment of the plurality of preliminary mask segments to obtain the intersection.

Some examples of the method further include replacing the border area with the generated area to obtain the generated image. Some examples of the method further include providing the digital image in a first layer of the generated image. Some examples further include providing the generated area in a second layer of the generated image.

FIG. 6 shows an example of a method 600 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, an image generation apparatus (such as the image generation apparatus described with reference to FIGS. 1 and 5) receives a digital image including a content area (e.g., an area depicting content) and a border area (e.g., an area including a border at least partially surrounding the content, such as image vignetting). According to some aspects, the image generation apparatus generates a border mask for the border area based on a symmetry of the digital image and/or an intersection of preliminary mask segments. According to some aspects, the image generation apparatus generates a generated image based on the border mask, wherein the generated image includes content extended from the content area and a generated area corresponding to the border area. For example, in some cases, the extended content thereby replaces the border area (and the image vignetting included in the border area).

At operation 605, the system obtains a digital image including a content area and a border area that includes at least two corners of the digital image. In some cases, the operations of this step refer to, or may be performed by, an image generation apparatus as described with reference to FIG. 5. Examples of a digital image including a content area and a border area are shown in and described with reference to FIGS. 1-4.

In some cases, a user provides the digital image to the image generation apparatus (for example, via a graphical user interface provided by the image generation apparatus on a user device). In some cases, the image generation apparatus retrieves the digital image from a database (such as the database described with reference to FIG. 1) or another data source (such as a website). In some cases, the image generation apparatus retrieves the digital image in response to a user instruction (for example, provided via the graphical user interface).

At operation 610, the system generates a border mask for the border area based on a symmetry of the border area with respect to the at least two corners. In some cases, the operations of this step refer to, or may be performed by, a mask component as described with reference to FIG. 5. In some cases, the image generation apparatus generates the border mask as described with reference to FIGS. 7 and 8.

At operation 615, the system generates a generated image based on the border mask, where the generated image includes the content area and a generated area corresponding to the border area, and where the generated area depicts an extension to content from the content area. In some cases, the operations of this step refer to, or may be performed by, an image generation network as described with reference to FIG. 5.

Figure 11:
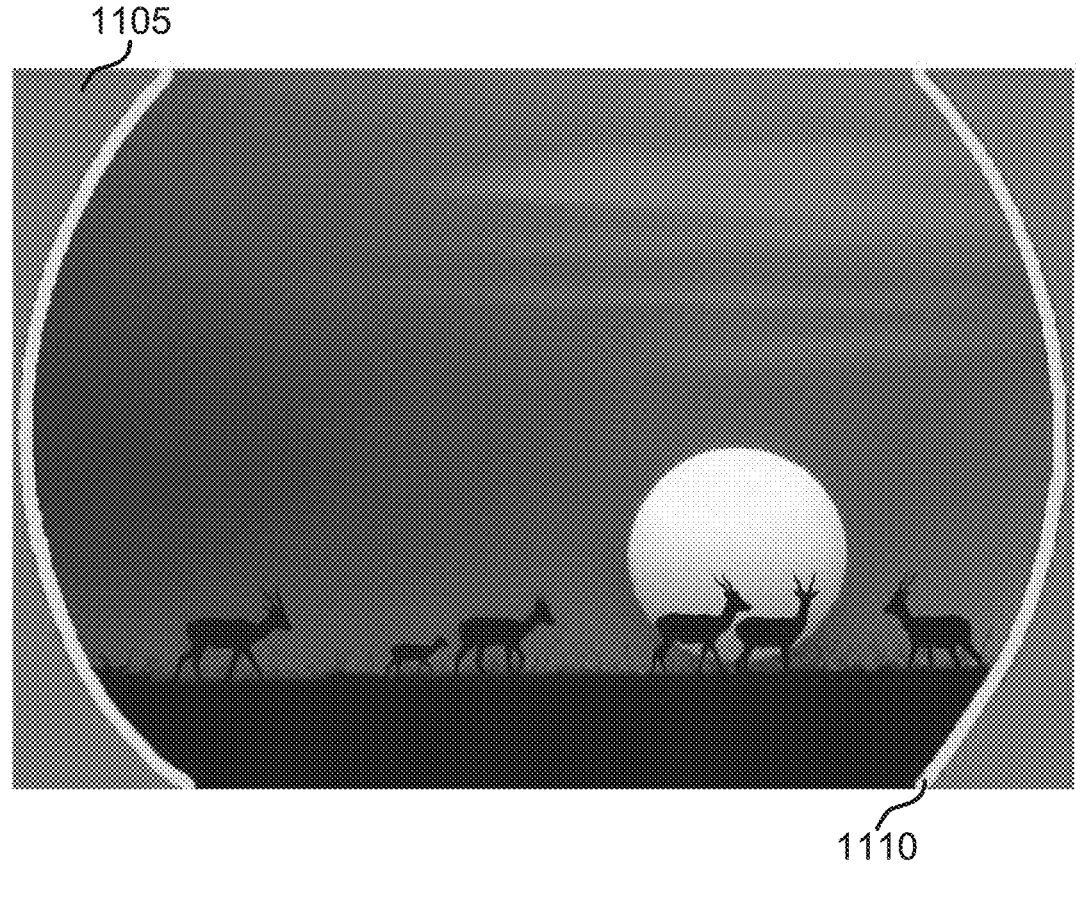
FIG. 11 shows an example of a border mask applied to a digital image according to aspects of the present disclosure.

In some cases, the image generation network receives the border mask and the digital image as input. In some cases, the image generation network aligns the border mask with the digital image and generates the generated area based on the aligned border mask. For example, in some cases, the image generation network aligns the border mask with the digital image based on one or more corners of the border mask and one or more corners of the digital image. An example of a border mask aligned with a digital image is shown in FIG. 11.

In some cases, the image generation network identifies the border area as the area of the digital image corresponding to a masked area of the border mask. In some cases, the image generation network identifies a pixel buffer surrounding the border area. For example, in some cases, the pixel buffer comprises a band of pixels included in the digital image that are disposed adjacent to the border area and the border mask. In some cases, a width of the pixel buffer is variable. In some cases, the width of the pixel buffer includes a number of pixels in the range of five pixels to ten pixels. In some cases, the image generation network includes the pixel buffer in the border mask. In some cases, the pixel buffer helps to smooth an edge of the border mask. An example of a pixel buffer is shown in FIG. 11.

In some cases, the image generation network replaces the border area with the generated area to obtain the generated image. In some cases, the image generation network replaces the border area by extending content of the content area of the digital image to the generated area. For example, in some cases, the image generation network is an ANN that is trained to predict the extension of the content into the generated area based on the content area and to generate the generated area based on the prediction. An example of a generated image is shown in FIG. 4.

According to some aspects, the generated image can be implemented according to a destructive editing process. For example, in some cases, the image generation apparatus provides the digital image in a layer of the generated image and provides the generated area in the same layer of the generated image.

According to some aspects, the generated image can be implemented according to a non-destructive editing process.

For example, in some cases, the image generation apparatus provides the digital image in a first layer of the generated image and provides the generated area in a second layer of the generated image. In some cases, the non-destructive editing process can allow a user to easily tweak the generated image if the user is not satisfied with the generated image. For example, in some cases, the image generation apparatus receives an edit to the digital image (for example, via the graphical user interface) and modifies the generated image based on the edit by editing the digital image in the first layer.

According to some aspects, the image obtains an additional digital image and generates an additional generated image based on the additional digital image and the border mask from the digital image.

In an example, in some cases, the digital image and the additional digital image are obtained using a same set of characteristics. For example, for a batch workflow in which a set of digital images are captured using a same camera and lens setup, a border mask generated for one digital image can be applied directly to other images as well, significantly increasing a speed and efficiency of the image editing process.

In another example, in some cases, the digital image and the additional digital image comprise frames of a single video. For example, the captured frames of the single video may each have the same border (for example, image vignetting).

In another example, in some cases, the image generation apparatus combines the generated image and the additional generated image to obtain a merged generated image. For example, each of the digital image and the additional digital image may be images produced by a panorama or HDR process in which multiple images are created at a same time and each of the multiple images includes a same border area.

Figure 7:
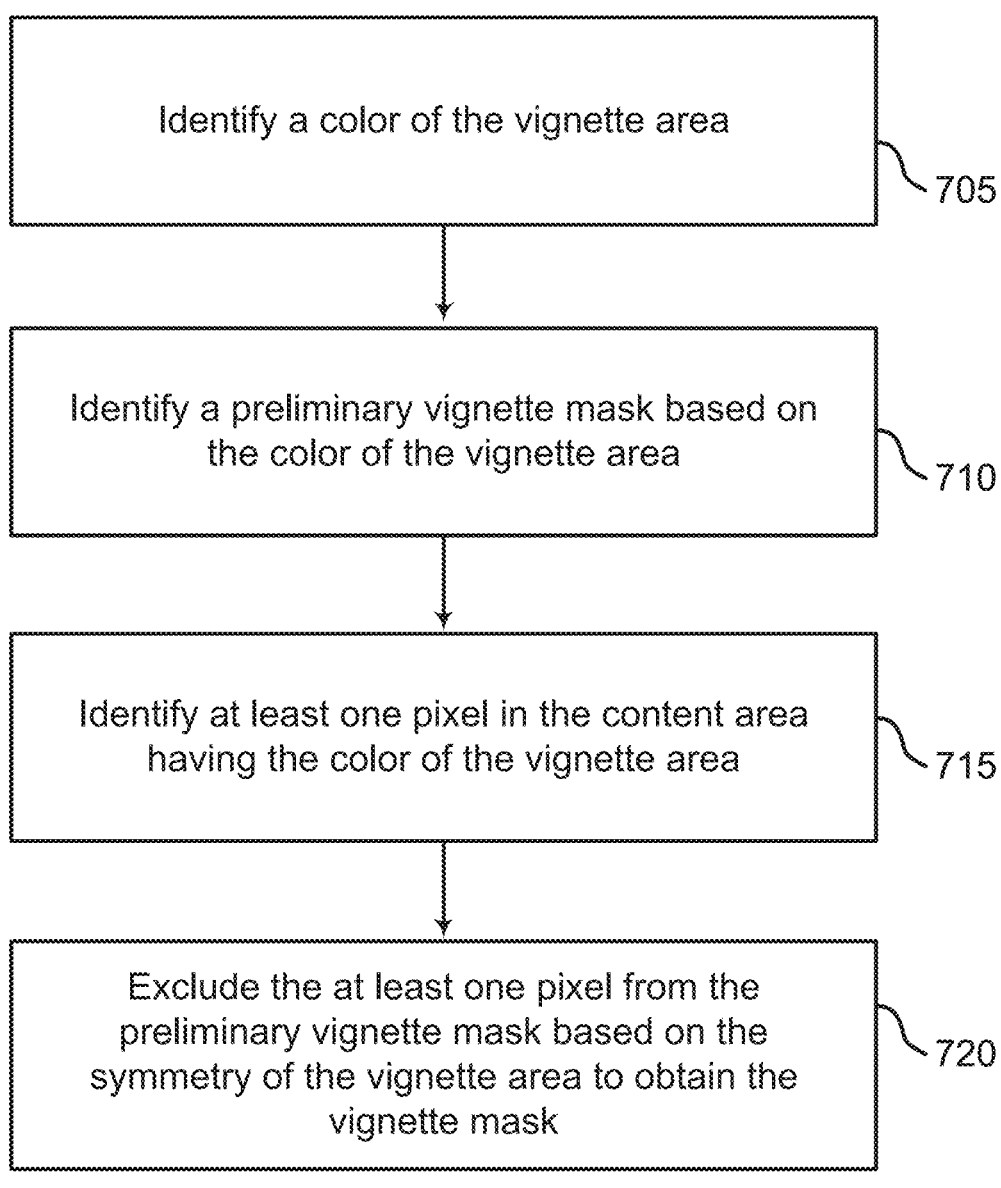
FIG. 7 shows an example of a method for obtaining a border mask according to aspects of the present disclosure.

FIG. 7 shows an example of a method 700 for obtaining a border mask according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies a color of the border area. In some cases, the operations of this step refer to, or may be performed by, a mask component as described with reference to FIG. 5.

In some cases, the system identifies the color based on a proximity to a corner of the image. For example, in some cases, the system determines that a color of a pixel disposed in a corner of the image is the color of the border area. In some cases, the color of the border area is predetermined. For example, in some cases, the mask component is configured to determine that the color of the border area is a particular color (such as black). In some cases, the system identifies the color of the border area based on a color identification user input. In some cases, the system determines that one or more colors of one or more pixels disposed within a predetermined distance of a corner of the image is a color of the border area. In some cases, the color comprises a black color. However, embodiments of the present disclosure are not limited thereto, and the color may comprise any color.

Figure 9:
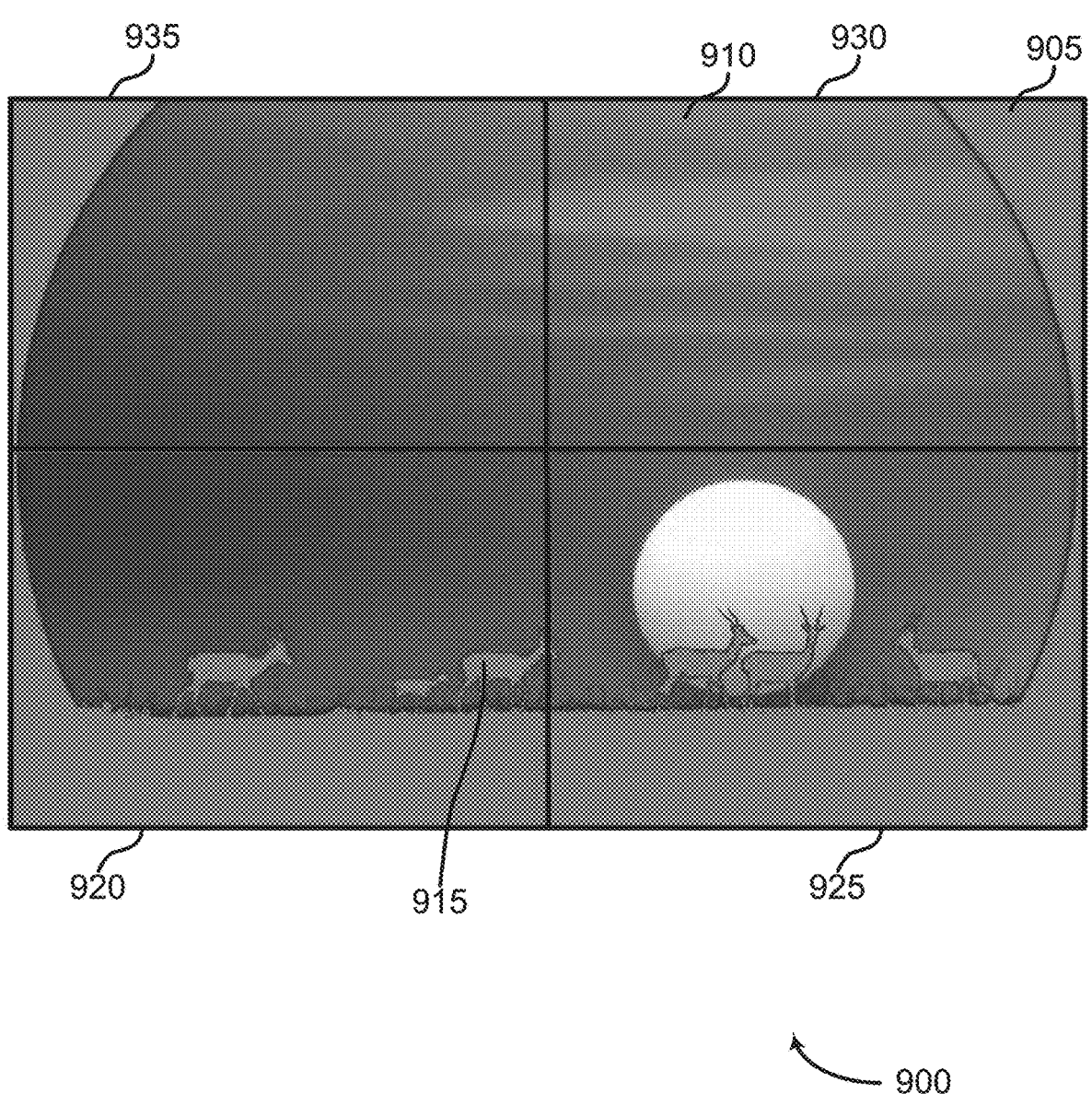
FIG. 9 shows an example of a set of preliminary mask segments according to aspects of the present disclosure.

At operation 710, the system identifies a preliminary border mask based on the color of the border area. In some cases, the operations of this step refer to, or may be performed by, a mask component as described with reference to FIG. 5. For example, in some cases, the mask component includes each pixel of the image comprising the color of the border area in the preliminary border mask. In some cases, the preliminary border mask is a color mask. An example of a preliminary border mask is shown in FIG. 9.

At operation 715, the system identifies at least one pixel in the content area having the color of the border area. In some cases, the operations of this step refer to, or may be performed by, a mask component as described with reference to FIG. 5. For example, in some cases, the mask component identifies the at least one pixel as described with reference to FIG. 8. An example of a pixel included in a content area having a color of the border area is shown in FIG. 9.

At operation 720, the system excludes the at least one pixel from the preliminary border mask based on the symmetry of the border area to obtain the border mask. In some cases, the operations of this step refer to, or may be performed by, a mask component as described with reference to FIG. 5. For example, in some cases, the mask component excludes the at least one pixel based on an intersection of preliminary mask segments as described with reference to FIG. 8.

According to some aspects, the mask component obtains the border mask by replicating the intersection of preliminary mask segments to obtain a set of intersection segments and changing an orientation of one or more of the set of intersection segments. A set of intersection segments is described with reference to FIG. 10. A border mask is described with reference to FIG. 11.

FIG. 8 shows an example of a method 800 for excluding a pixel from a preliminary border mask according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Figure 10:
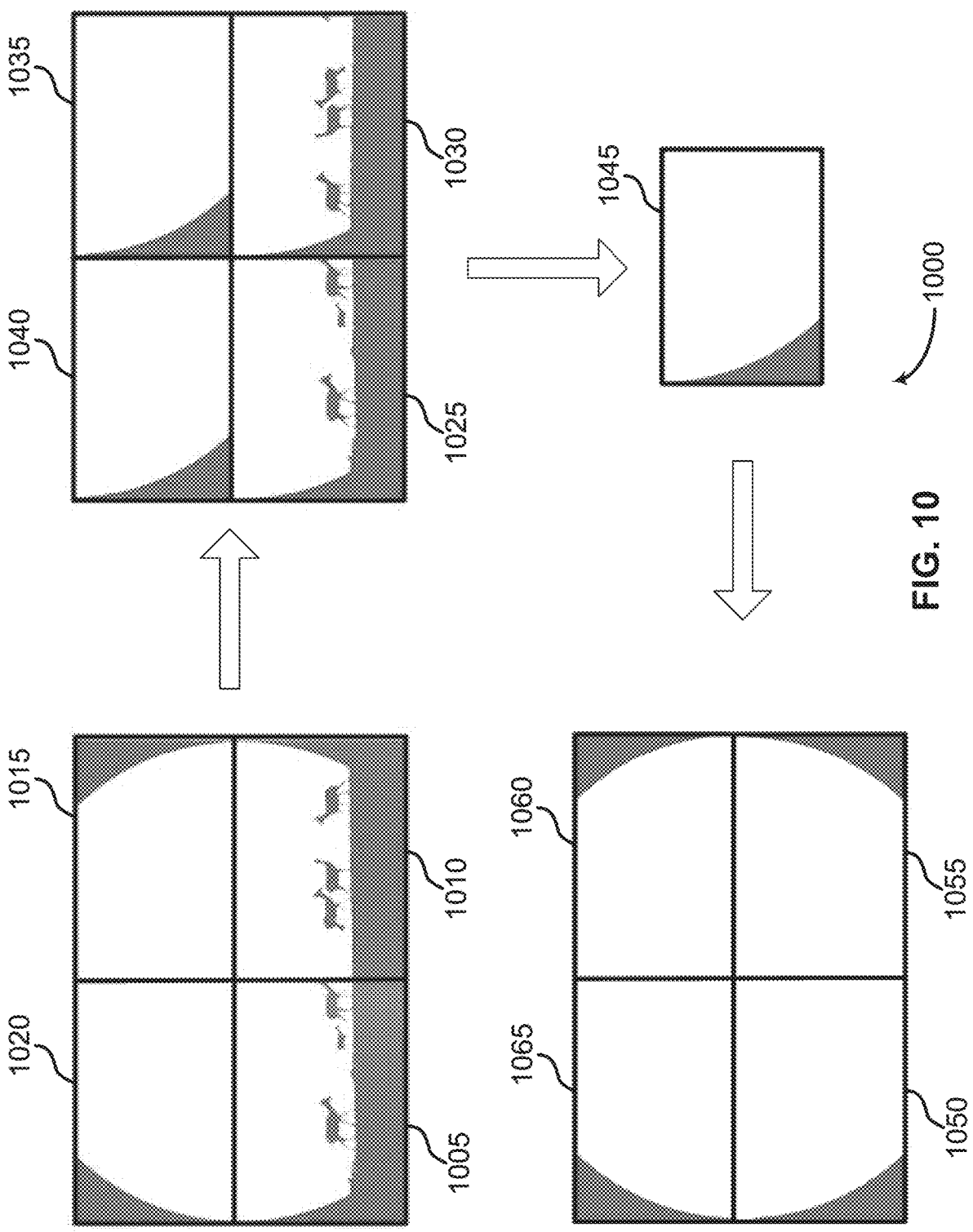
FIG. 10 shows an example of obtaining a set of mask segments according to aspects of the present disclosure.

At operation 805, the system divides the preliminary border mask based on the symmetry of the border area to obtain a set of preliminary mask segments. In some cases, the operations of this step refer to, or may be performed by, a mask component as described with reference to FIG. 5. For example, in some cases, the mask component divides the digital image described with reference to FIG. 6 into two or more equal areas along one or more axes of symmetry to obtain one or more segments of the digital image. In some cases, each portion of the preliminary border mask disposed within a respective segment of the digital image is included in a respective preliminary mask segment. An example of a set of preliminary mask segments is shown in FIGS. 9 and 10.

At operation 810, the system identifies an intersection of the set of preliminary mask segments. In some cases, the operations of this step refer to, or may be performed by, a mask component as described with reference to FIG. 5. For example, in some cases, the mask component changes an orientation of a first preliminary mask segment of the set of preliminary mask segments to obtain a flipped preliminary mask segment and compares the flipped preliminary mask segment to a second preliminary mask segment of the set of preliminary mask segments to obtain the intersection. An example of finding an intersection of a set of preliminary mask segments is shown in FIG. 10.

At operation 815, the system determines that the at least one pixel is located outside of the intersection, where the at least one pixel is excluded from the preliminary border mask based on the determination. In some cases, the operations of this step refer to, or may be performed by, a mask component as described with reference to FIG. 5. An example intersection is shown in FIG. 10.

FIG. 9 shows an example of a set of preliminary mask segments according to aspects of the present disclosure. The example shown includes digital image 900, preliminary border mask 905, content area 910, element 915, first preliminary mask segment 920, second preliminary mask segment 925, third preliminary mask segment 930, and fourth preliminary mask segment 935. Digital image 900 is an example of, or includes aspects of, the corresponding element described with reference to FIGS. 4 and 11. First preliminary mask segment 920, second preliminary mask segment 925, third preliminary mask segment 930, and fourth preliminary mask segment 935 are examples of, or include aspects of, the corresponding elements described with reference to FIG. 10.

Referring to FIG. 9, an image generation apparatus (such as the image generation apparatus described with reference to FIGS. 1 and 5) identifies a preliminary border mask 905 for digital image 900 based on a color of a border area included in digital image 900. Because preliminary border mask 905 is identified based on a color of the border area, preliminary border mask 905 includes an area corresponding to both the border area and to same-colored elements included in content area (such as element 915). Pixels corresponding to preliminary border mask 905 are illustrated in FIG. 9 by a gray color. As shown in FIG. 9, preliminary border mask 905 is continuous. However, embodiments of the present disclosure are not limited thereto, and each of a border area and a preliminary border mask may include one or more discontinuities.

Digital image 900 is divided into four segments along two orthogonal axes of symmetry. For the sake of illustration, the four regions are outlined by black lines. Each portion of preliminary border mask 905 respectively included in each of the four segments of digital image 900 is included in four respective preliminary mask segments (e.g., first preliminary mask segment 920, second preliminary mask segment 925, third preliminary mask segment 930, and fourth preliminary mask segment 935). As shown, each of first preliminary mask segment 920, second preliminary mask segment 925, third preliminary mask segment 930, and fourth preliminary mask segment 935 is included in a set of preliminary mask segments. Embodiments of the present disclosure are not limited to a particular number of preliminary mask segments.

FIG. 10 shows an example 1000 of obtaining a set of mask segments according to aspects of the present disclosure. The example shown includes first preliminary mask segment 1005, second preliminary mask segment 1010, third preliminary mask segment 1015, fourth preliminary mask segment 1020, reference preliminary mask segment 1025, flipped second preliminary mask segment 1030, flipped third preliminary mask segment 1035, flipped fourth preliminary mask segment 1040, intersection 1045, first mask segment 1050, second mask segment 1055, third mask segment 1060, and fourth mask segment 1065.

First preliminary mask segment 1005, second preliminary mask segment 1010, third preliminary mask segment 1015, and fourth preliminary mask segment 1020 are examples of, or include aspects of, the corresponding elements described with reference to FIG. 9. As shown in FIG. 10, first preliminary mask segment 1005, second preliminary mask segment 1010, third preliminary mask segment 1015, and fourth preliminary mask segment 1020 are included in a set of preliminary mask segments, and first mask segment 1050, second mask segment 1055, third mask segment 1060, and fourth mask segment 1065 are included in the set of mask segments.

Referring to FIG. 10, each of first preliminary mask segment 1005, second preliminary mask segment 1010, third preliminary mask segment 1015, and fourth preliminary mask segment 1020 includes a masked region (e.g., relatively dark pixels) corresponding to pixels of a digital image (e.g., the digital image described with reference to FIGS. 4, 9, and 11) having a same color as a border area of the digital image and a non-masked region corresponding to pixels of the digital image that do not have a same color as the border area. In some cases, the non-masked regions provide for a maintenance of relative spacing of the pixels included in the masked regions.

FIG. 10 shows a manipulation of the orientation of one or more preliminary mask segments to obtain flipped preliminary mask segments. For example, in some cases, a mask component (such as the mask component described with reference to FIG. 5) identifies a preliminary mask segment of a set of preliminary mask segments as a reference preliminary mask segment and manipulates an orientation of each remaining preliminary mask segment of the set of preliminary mask segments to match an orientation of the reference preliminary mask segment.

As shown in FIG. 10, the mask component identifies first preliminary mask segment 1005 as reference preliminary mask segment 1025. The mask component changes an orientation of each of second preliminary mask segment 1010, third preliminary mask segment 1015, and fourth preliminary mask segment 1020 based on axes of symmetry for corners of the set of preliminary mask segments respectively disposed between first preliminary mask segment 1005 and each of second preliminary mask segment 1010, third preliminary mask segment 1015, and fourth preliminary mask segment 1020.

For example, the mask component flips second preliminary mask segment 1010 along a vertical axis of symmetry disposed between first preliminary mask segment 1005 and second preliminary mask segment 1010 to obtain flipped second preliminary mask segment 1030, flips third preliminary mask segment 1015 along the vertical axis of symmetry and a horizontal axis of symmetry disposed between first preliminary mask segment 1005 and third preliminary mask segment 1015 to obtain flipped third preliminary mask segment 1035, and flips fourth preliminary mask segment 1020 along the horizontal axis of symmetry disposed between first preliminary mask segment 1005 and fourth preliminary mask segment 1020 to obtain flipped fourth preliminary mask segment 1040.

According to some aspects, the mask component compares the reference preliminary mask segment and the one or more flipped masks segments with each other to determine an intersection of pixels disposed in each of the reference preliminary mask segment and one or more flipped preliminary mask segments. For example, as shown in FIG. 10, the mask component compares each of reference preliminary mask segment 1025, flipped second preliminary mask segment 1030, flipped third preliminary mask segment 1035, and flipped fourth preliminary mask segment 1040 with each other to determine intersection 1045. As shown in FIG. 10, intersection 1045 includes a masked region that excludes any pixels of the preliminary border mask described with reference to FIG. 9 that do not correspond to the border area of the digital image described with reference to FIG. 9.

According to some aspects, the mask component generates a border mask based on an intersection (such as intersection 1045). In an example, the mask component generates a number of copies of the intersection equal to the number of reference preliminary mask segments and flipped preliminary mask segments and performs a reverse of the manipulation of the orientation of the preliminary mask segments on the copies of the intersection.

For example, as shown in FIG. 10, mask component places a first copy of intersection 1045 in a relative bottom-left position to obtain first mask segment 1050, flips a second copy of intersection 1045 from the bottom left position along the vertical axis of symmetry to obtain second mask segment 1055, flips a third copy of intersection 1045 along the vertical axis of symmetry and the horizontal axis of symmetry to obtain third mask segment 1060, and flips a fourth copy of intersection 1045 along the horizontal axis of symmetry to obtain fourth mask segment 1065.

In some cases, a border mask comprises each of a set of mask segments. In some cases, the non-masked region disposed in each copy of intersection 1045 allows a relative spacing of pixels within the masked region of the border mask to be maintained. In some cases, the mask component aligns a corner pixel of each mask segment in a position corresponding to a respective preliminary mask segment.

FIG. 11 shows an example of a border mask 1105 applied to a digital image 1100 according to aspects of the present disclosure. The example shown includes digital image 1100, border mask 1105, and pixel buffer 1110. Digital image 1100 is an example of, or includes aspects of, the corresponding element described with reference to FIGS. 4 and 9.

Referring to FIG. 11, a mask component (such as the mask component described with reference to FIG. 5) obtains border mask 1105 based on an intersection of preliminary mask segments (such as the intersection described with reference to FIG. 10). As shown in FIG. 11, border mask 1105 comprises the set of mask segments described with reference to FIG. 10. As shown in FIG. 11, border mask 1105 is aligned with digital image 1100.

According to some aspects, by generating a border mask that excludes any pixels not included in an intersection of preliminary mask segments and aligning the border mask with a digital image, the image generation apparatus is able to effectively distinguish a border area of the digital image from other pixels of the digital image that share a same color with the border area, even when the other pixels are contiguous with a portion of the border area.

As shown in FIG. 11, an image generation network (such as the image generation network described with reference to FIG. 5) determines pixel buffer 1110 as described with reference to FIG. 6. In some cases, pixel buffer 1110 is included in border mask 1105.

FIG. 12 shows an example of a computing device 1200 for image generation according to aspects of the present disclosure. In one aspect, computing device 1200 includes processor(s) 1205, memory subsystem 1210, communication interface 1215, I/O interface 1220, user interface component(s) 1225, and channel 1230.

In some embodiments, computing device 1200 is an example of, or includes aspects of, the image generation apparatus as described with reference to FIGS. 1 and 5. In some embodiments, computing device 1200 includes one or more processors 1205 that can execute instructions stored in memory subsystem 1210 to obtain a digital image including a content area and a border area that includes at least two corners of the digital image, generate a border mask for the border area based on a symmetry of the border area with respect to the at least two corners, and generate a generated image based on the border mask, where the generated image includes the content area and a generated area corresponding to the border area, and where the generated area depicts an extension to content from the content area.

According to some aspects, processor(s) 1205 are included in the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1210 includes one or more memory devices. Memory subsystem 1210 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some aspects, user interface component(s) 1225 enable a user to interact with computing device 1200. In some cases, user interface component(s) 1225 include an audio device, such as an external speaker system, an external display device such as a display screen, an input device (e.g., a remote control device interfaced with a user interface directly or through the I/O controller), or a combination thereof. In some cases, user interface component(s) 1225 include a GUI.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
obtaining a digital image including a content area and a border area;
generating, using a mask component, a border mask for the border area by identifying a first preliminary mask segment and a second preliminary mask segment based on a color of the border area, flipping the first preliminary mask segment to match an orientation of the second preliminary mask segment, identifying a pixel of the first preliminary mask segment that is located outside of an intersection of the flipped first preliminary mask segment and the second preliminary mask segment, excluding the identified pixel from the first preliminary mask segment to obtain a border mask segment, and combining the border mask segment and the second preliminary mask segment to obtain the border mask; and
generating, using an image generation network, a generated image based on the border mask, wherein the generated image includes the content area and a generated area corresponding to the border area, and wherein the generated area depicts an extension to content from the content area.

2. The method of claim 1, wherein:
the generated area replaces the border area of the digital image in the generated image.

3. The method of claim 1, further comprising:
obtaining the first preliminary mask segment and the second preliminary mask segment based on a symmetry of the border area.

4. The method of claim 1, further comprising:
aligning the border mask with the digital image; and
generating the generated area based on the aligned border mask.

5. The method of claim 4, further comprising:
identifying a pixel buffer surrounding the border area; and
including the pixel buffer in the border mask.

6. The method of claim 1, further comprising:
replacing the border area with the generated area to obtain the generated image.

7. The method of claim 1, further comprising:
providing the digital image in a first layer of the generated image; and
providing the generated area in a second layer of the generated image.

8. The method of claim 7, further comprising:
receiving an edit to the digital image; and
modifying the generated image based on the edit by editing the digital image in the first layer.

9. The method of claim 1, further comprising:
obtaining an additional digital image; and
generating, using the image generation network, an additional generated image based on the additional digital image and the border mask from the digital image.

10. The method of claim 9, wherein:
the digital image and the additional digital image are obtained using a same set of camera characteristics.

11. The method of claim 9, wherein:
the digital image and the additional digital image comprise frames of a single video.

12. The method of claim 9, further comprising:
combining the generated image and the additional generated image to obtain a merged generated image.

13. A non-transitory computer readable medium storing instructions that, when executed by a processor, cause the processor to:
obtain a digital image including a content area and a border area including a first corner and a second corner of the digital image;
generate, using a mask component, a border mask for the border area by identifying a first preliminary mask segment and a second preliminary mask segment, flipping the first preliminary mask segment to match an orientation of the second preliminary mask segment, identifying an intersection of the flipped first preliminary mask segment and the second preliminary mark segment, and flipping a copy of the intersection to match an orientation of the first preliminary mask segment, wherein the border mask comprises the intersection and the copy of the intersection; and
generate, using an image generation network, a generated image based on the border mask, wherein the generated image includes the content area and a generated area corresponding to the border area.

14. The non-transitory computer readable medium of claim 13, wherein the instructions further cause the processor to:
replace the border area with the generated area to obtain the generated image.

15. The non-transitory computer readable medium of claim 13, wherein the instructions further cause the processor to:
provide the digital image in a first layer of the generated image; and
provide the generated area in a second layer of the generated image.

16. A system for image generation, comprising:
one or more processors;
one or more memory components coupled with the one or more processors;
a mask component designed to generate a border mask for a border area of a digital image by identifying a first preliminary mask segment and a second preliminary mask segment based on a color of the border area, flipping the first preliminary mask segment to match an orientation of the second preliminary mask segment, identifying a pixel of the first preliminary mask segment that is located outside of an intersection of the flipped first preliminary mask segment and the second preliminary mask segment, excluding the identified pixel from the first preliminary mask segment to obtain a border mask segment, and combining the border mask segment and the second preliminary mask segment to obtain the border mask; and
an image generation network including parameters stored in the one or more memory components and trained to generate a generated image based on the border mask, wherein the generated image includes a content area of the digital image and a generated area corresponding to the border area, and wherein the generated area depicts an extension to content from the content area.

\*   \*   \*   \*   \*